United States Patent [19]

Nigrin

[11] Patent Number: 5,204,291

[45] Date of Patent: Apr. 20, 1993

[54] TRANSPARENT LEAD-FREE GLAZES

[75] Inventor: Jaroslava M. Nigrin, Corning, N.Y.

[73] Assignee: Corning Incorporated, Corning, N.Y.

[21] Appl. No.: 870,677

[22] Filed: Apr. 17, 1992

[51] Int. Cl.$^5$ .......................... C03C 8/02; C03C 3/093
[52] U.S. Cl. ........................................ 501/21; 501/14;
501/26; 501/67; 501/70; 501/72; 501/153;
501/154; 428/426; 428/428
[58] Field of Search ........................ 501/14, 21, 26, 66,
501/67, 69, 70, 72, 153, 154; 428/426, 428

[56] References Cited

U.S. PATENT DOCUMENTS

| | | | |
|---|---|---|---|
| 2,995,468 | 8/1961 | Steiger | 501/21 |
| 2,998,320 | 8/1961 | Stimple | 501/21 |
| 3,091,345 | 2/1962 | Becker | 501/14 |
| 4,376,169 | 3/1983 | Eppler | 501/24 |
| 4,386,162 | 5/1983 | Beall | 501/3 |
| 4,446,241 | 5/1984 | Francel et al. | 501/14 |
| 4,467,039 | 8/1984 | Beall et al. | 501/3 |
| 4,537,862 | 8/1985 | Francel et al. | 501/14 |
| 4,582,760 | 4/1986 | Beall et al. | 428/428 |
| 4,590,171 | 5/1986 | Nigrin | 501/25 |
| 4,608,348 | 8/1986 | Beall et al. | 501/3 |
| 4,731,347 | 3/1988 | Stetson | 501/21 |
| 4,814,298 | 3/1989 | Nelson et al. | 501/17 |
| 4,877,758 | 10/1989 | Lee et al. | 501/24 |
| 4,892,847 | 1/1990 | Reinherz | 501/14 |
| 4,975,391 | 12/1990 | Shimizu et al. | 501/21 |
| 5,070,043 | 12/1991 | Amundson, Jr. et al. | 501/3 |

*Primary Examiner*—Mark L. Bell
*Assistant Examiner*—Michael A. Marcheschi
*Attorney, Agent, or Firm*—C. S. Janes, Jr.

[57] ABSTRACT

This invention relates to lead-free and cadmium-free frit compositions for glazes and enamels which consist essentially, expressed in terms of weight percent on the oxide basis, of

| | | | |
|---|---|---|---|
| $SiO_2$ | 51-59 | CaO | 0-7 |
| $Li_2O$ | 0-2 | SrO | 0-12 |
| $Na_2O$ | 3.5-7 | BaO | 0-9 |
| $K_2O$ | 6-8.5 | ZnO | 0-10 |
| $Li_2O + Na_2O + K_2O$ | 10-15 | CaO + SrO + BaO + ZnO | 8-18 |
| $B_2O_3$ | 9-12 | $Al_2O_3$ | 4.5-7 | with the proviso that the mole ratio $(Li_2O + Na_2O + K_2O):(CaO + SrO + ZnO)$ is greater than 1.0 and ranges up to about 1.4.

4 Claims, No Drawings

TRANSPARENT LEAD-FREE GLAZES

BACKGROUND OF THE INVENTION

Glazes are recognized in the art of decorating glass, glass-ceramic, and ceramic bodies as being transparent glasses which are applied to provide decorative designs and finishes for the surfaces thereof to enhance the aesthetic appearance of the bodies, thereby promoting customer appeal. Glazes are conventionally applied to a surface in the form of a slurry or slip of finely-divided glass particles, commonly termed "frit", and, after drying the slip, this frit is fired to fuse the particles to form a well-bonded, continuous glassy coating on the surface of the body.

Commercially marketed frits have customarily contained high levels of lead oxide (PbO) and, less often, substantial amounts of cadmium oxide (CdO). Those oxides display two properties which make them particularly desirable to use in glazing frits. First, they "soften" the glass; i.e., they lower the melting point of the glass such that it can be fused to flow along the surface of the body to be glazed at a temperature which is sufficiently low to preclude thermal deformation of the body. Second, they raise the refractive index of the glass, thereby heightening the gloss exhibited by the glaze. CdO has also been utilized as a colorant in certain frits. Unfortunately, however, both CdO and PbO are highly toxic such that stringent regulations have been applied by the Food and Drug Administration (FDA) with respect to their release when compositions including those compounds come into contact with food.

Thus, the FDA has established maximum limits for the release of lead from glazed surfaces. In the prescribed test a glazed surface is contacted with an aqueous 4% acetic acid solution at room temperature for 24 hours. A sample of the acetic acid solution is thereafter tested for absorbance in an atomic absorption spectroscope and the observed value converted to a metal concentration value on a standard curve, the lead content being reported in parts per million (ppm). That lead value is based upon the inside volume of a hollow article having a glazed or decorated surface and filled to a specified level with the acetic acid solution for the test. A similar test has also been devised for use on exterior surfaces of a vessel or dish.

U.S. Pat. No. 4,582,760 (Beall et al.) discloses glazes designed for application to glass-ceramic articles wherein potassium fluorrichterite crystals comprise the predominant crystal phase therein or wherein potassium fluorrichterite plus cristobalite in amounts in excess of 10% by volume, commonly about 10–20%, constitute essentially the sole crystal phases. The former glass-ceramic articles are described in U.S. Pat. No. 4,467,039 (Beall et al.) and consist essentially, expressed in terms of weight percent on the oxide basis, of

| $SiO_2$ | 50–70 | $Na_2O$ | 2–9 |
| $CaO$ | 4–15 | $K_2O$ | 2–12 |
| $MgO$ | 8–25 | $Li_2O$ | 0–3 |
| $F$ | 3–8 | $Al_2O_3$ | 0–7. |

The latter glass-ceramic articles are reported in U.S. Pat. No. 4,608,348 (Beall et al.) and consist essentially, expressed in terms of weight percent on the oxide basis, of

| $SiO_2$ | 65–69 | $Na_2O$ | 1.5–3.5 |
| $Al_2O_3$ | 0.75–3.5 | $K_2O$ | 4.2–6 |
| $MgO$ | 13.5–17.5 | $BaO$ | 0–2.5 |
| $CaO$ | 3–4.8 | $P_2O_5$ | 0–2.5 |
| $Li_2O$ | 0.5–2 | $F$ | 3.3–5.5. |

The glazes disclosed in U.S. Pat. No. 4,582,760 demonstrated a lead release not exceeding 1 ppm when subjected to the FDA test procedure and consisted essentially, expressed in terms of weight percent on the oxide basis, of

| $SiO_2$ | 46–50 | $Na_2O$ | 2–3.5 | $SrO$ | 2–6 |
| $Al_2O_3$ | 5–8 | $K_2O$ | 1–2 | $B_2O_3$ | 9–11 |
| $ZrO_2$ | 0.3–1 | $CaO$ | 1–4 | $PbO$ | 20–25. |
| $Li_2O$ | 1–2 | $ZnO$ | 2–6 | | |

That release of lead is far below the maximum limit permitted by the FDA.

Nevertheless, because of continued public pressure for the complete elimination of lead and cadmium from materials coming into contact with food, research has been constant to develop lead- and cadmium-free glasses operable as frits for glazing glass, glass-ceramic, and ceramic articles. It will be recognized that the removal of PbO and/or CdO from the glass composition has required the substitution of other ingredients to confer the necessary chemical and physical properties to the frits. That is, the frits must demonstrate the following attributes:

(1) the frit must manifest good glass stability, i.e., the frit should not devitrify during firing to coat the surface of an article;

(2) the frit must exhibit excellent resistance to attack by acids and bases because corrosion of the glaze can lead to loss of gloss, the generation of haze and/or iridescence, the development of porosity, or other defects deleterious to the appearance and/or physical character of the glaze;

(3) the firing or maturing temperature of the frit, i.e., the temperature at which the frit displays enough flow to produce a smooth homogeneous coating, ought to be sufficiently low to inhibit thermal deformation of the body being coated; and (4) the linear coefficient of thermal expansion of the frit must be compatible with that of the article being coated to preclude crazing and/or spalling, with the preferred frits having a linear coefficient of thermal expansion somewhat lower than that of the article being coated, thereby placing the matured coating under compressive stress when the coated body is cooled to room temperature.

The linear coefficients of thermal expansion of the glazes set forth in U.S. Pat. No. 4,582,760, supra, ranged between about $60–70 \times 10^{-7}/°C.$ over the temperature range $0°–300°$ C., thereby assuring the development of surface compression when applied to the glass-ceramic bodies of U.S. Pat. No. 4,467,039 and U.S. Pat. No. 4,608,348, supra, those bodies demonstrating linear coefficients of thermal expansion ($0°–30°$ C.) in the region of about $80–100 \times 10^{-7}/°C.$ for the articles of U.S. Pat. No. 4,467,039 and about $100–140 \times 10^{-7}/°C.$ for the articles of U.S. Pat. No. 4,608,348.

It will be recognized that, where the glaze-coated bodies are intended for use in food preparation and/or service applications, the glazes must resist attack by acids and bases present in foods and by detergents such as are employed in commercial dishwashers.

Corning Incorporated, Corning, N.Y., has marketed a glass-ceramic dinnerware as Corning Code 0308 under the trademark SUPREMA ® which is encompassed within U.S. Pat. No. 4,608,348, supra, in that it contains potassium fluorrichterite and cristobalite as the predominant crystal phases and has the following approximate base composition, expressed in terms of weight percent on the oxide basis, of

| $SiO_2$ | 66.8 | $K_2O$ | 4.75 | $Sb_2O_3$ | 0.23 |
|---|---|---|---|---|---|
| $Al_2O_3$ | 1.7 | $Na_2O$ | 3.3 | NiO | 0.014 |
| MgO | 14.5 | $Li_2O$ | 0.8 | $Co_3O_4$ | 0.0015 |
| CaO | 4.4 | $P_2O_5$ | 1.15 | $Fe_2O_3$ | 0.02. |
| BaO | 0.21 | F | 3.74 | | |

A color package consisting, in weight percent, of

| 0.065–0.16 | $Fe_2O_3$ |
|---|---|
| 0.055–0.16 | NiO |
| 0.0015–0.0029 | Se |
| 0–0.0014 | $Co_3O_4$ | has been added to the base composition for SUPREMA ® dinnerware to impart a beige tint thereto, that addition being disclosed in U.S. Pat. No. 5,070,043 (Amundson, Jr. et al.). The crystal microstructure and the chemical and physical properties of the ware are not altered by the addition. The product, marketed as Corning Code 0309, has the following approximate composition, expressed in terms of weight percent on the oxide basis, of

| $SiO_2$ | 66.1 | $K_2O$ | 4.75 | $Sb_2O_3$ | 0.07 |
|---|---|---|---|---|---|
| $Al_2O_3$ | 1.67 | $Na_2O$ | 3.15 | NiO | 0.085 |
| MgO | 14.11 | $Li_2O$ | 0.78 | $Co_3O_4$ | <0.0005 |
| CaO | 4.63 | $P_2O_5$ | 1.15 | $Fe_2O_3$ | 0.07 |
| BaO | 0.22 | F | 3.3 | Se | 0.0018. |

The primary objective of the present invention was to devise lead-free and cadmium-free glazes operable for use with glass-ceramic bodies having compositions within the disclosure of U.S. Pat. No. 4,608,348 and U.S. Pat. No. 5,070,043. Stated in another way, the goal of the invention was to find a replacement for the glazes described in U.S. Pat. No. 4,582,760; that is, glazes exhibiting chemical and physical properties similar to those demonstrated by the patented glazes, but having no lead or cadmium content in their compositions.

A specific objective of the present invention was to develop a lead-free and cadmium-free glaze suitable for application to ware marketed under the trademark SUPREMA ®.

SUMMARY OF THE INVENTION

Those objectives can be realized with glaze compositions consisting essentially, expressed in terms of weight percent on the oxide basis, of

| $SiO_2$ | 51–59 | CaO | 0–7 |
|---|---|---|---|
| $Li_2O$ | 0–2 | SrO | 0–12 |
| $Na_2O$ | 3.5–7 | BaO | 0–9 |
| $K_2O$ | 6–8.5 | ZnO | 0–10 |
| $Li_2O + Na_2O + K_2O$ | 10–15 | CaO + SrO + BaO + ZnO | 8–18 |
| $B_2O_3$ | 9–12 | $Al_2O_3$ | 4.5–7 | with the proviso that the mole ratio $(Li_2O+Na_2O+K_2O):(CaO+SrO+BaO+ZnO)$ is greater than 1.0 and ranges up to about 1.4.

Those glazes exhibit linear coefficients of thermal expansion (25°–300° C.) no higher than $85 \times 10^{-7}/°C.$, preferably about $70–85 \times 10^{-7}/°C.$, thereby assuring the development of a surface compression layer. They demonstrate good flow at temperatures between 900°–1000° C. such that thermal deformation of the glass-ceramic ware is avoided. They strongly resist attack by acids and bases. They offer excellent visual appearance, including good transparency, and high gloss. Thus, the properties of the inventive glazes closely match the properties exhibited by the glazes disclosed in U.S. Pat. No. 4,582,760.

The preferred glaze compositions consist essentially, expressed in terms of weight percent on the oxide basis, of

| $Li_2O$ | 1–2 | SrO | 2.5–6.5 |
|---|---|---|---|
| $Na_2O$ | 4–7 | $B_2O_3$ | 10–11.5 |
| $K_2O$ | 6.5–8 | $Al_2O_3$ | 5–6.5 |
| ZnO | 7–9.5 | $SiO_2$ | 55.5–58.5 | with the proviso that the mole ratio $(Na_2O+K_2O):(SrO+ZnO)$ is greater than 1.0 and ranges up to about 1.2.

Whereas the above description is drawn to transparent, colorless frit compositions, it will be appreciated that colorants conventional in the glass art, e.g., the transition metal oxides CoO, $Cr_2O_3$, CuO, $Fe_2O_3$, $MnO_2$, NiO, and $V_2O_5$, selenium, and the rare earth metal oxides, can be included in customary amounts, preferably up to about 2%.

PRIOR ART

U.S. Pat. No. 4,084,976 (Hinton) discloses lead-free glazes designed for coating alumina bodies, the glazes consisting essentially, in weight percent, of

| $SiO_2$ | 50–54 | SrO | 5–8 |
|---|---|---|---|
| $Al_2O_3$ | 5–8 | BaO | 2–15 |
| $B_2O_3$ | 6–12 | ZnO | 1–2 |
| MgO | 2–8 | $Li_2O + Na_2O + K_2O$ | 4–6. |

The alkali metal oxide and silica contents are generally below those demanded in the instant inventive glazes and MgO is a required constituent.

U.S. Pat. No. 4,120,733 (Knapp) describes lead-free glazes for coating alumina bodies, the glazes consisting essentially, in weight percent, of

| $SiO_2$ | 48–54 | BaO | 11–14 |
|---|---|---|---|
| $Al_2O_3$ | 7–11 | ZnO | 2–2.5 |
| $B_2O_3$ | 16.5–20 | $Na_2O$ | 4.25–5.25 |
| CaO | 2–3 | $K_2O$ | 0.4–1 |
| MgO | 0–1 | $Li_2O$ | 0–0.25. |

The concentrations of $SiO_2$ and alkali metal oxides are generally less than are necessary in the subject inventive glasses and the levels of $Al_2O_3$ and BaO are too high.

U.S. Pat. No. 4,256,497 (Knapp) reports lead-free glazes formulated for coating alumina bodies, the glazes consisting essentially, in weight percent, of

| SiO$_2$ | 35–54 | SrO | 8.5–21 |
|---|---|---|---|
| Al$_2$O$_3$ | 7–11 | ZnO | 2–2.5 |
| B$_2$O$_3$ | 17–25 | Na$_2$O | 4.25–5 |
| CaO | 2–3 | K$_2$O + Li$_2$O + MgO | 0.7–1. |

The amounts of SiO$_2$ and alkali metal oxides are generally below those required in the present inventive lazes and the B$_2$O$_3$ and Al$_2$O$_3$ contents are higher.

U.S. Pat. No. 4,340,645 (O'Conor) is directed to lead-free glazes suitable for coating ceramic dinnerware, the glazes consisting essentially, in weight percent, of

| SiO$_2$ | 53–61 | SrO | 1.7–4 |
|---|---|---|---|
| Al$_2$O$_3$ | 7–12 | BaO | 0–5 |
| B$_2$O$_3$ | 2–6 | ZrO$_2$ | 0–8 |
| MgO | 0–0.7 | Li$_2$O + Na$_2$O + K$_2$O | 3.5–6.5 |
| CaO | 6–12 | ZnO | 6–12.5. |

The levels of B$_2$O$_3$ and alkali metal oxides are less than those needed in the instant inventive glazes and the concentration of Al$_2$O$_3$ is higher.

U.S. Pat. No. 4,493,900 (Nishino et al.) is drawn to lead-free enamels destined for coating metals such as iron, steel, and aluminum, the enamels consisting essentially, in weight percent, of

| SiO$_2$ | 31–39 | K$_2$O | 1–5 |
|---|---|---|---|
| B$_2$O$_3$ | 13–21 | ZnO | 5–20 |
| Na$_2$O | 14–21 | F | 2–10 | and 2–9% total of 0–5% Al$_2$O$_3$+0–5% TiO$_2$+0–5% ZrO$_2$.

The content of SiO$_2$ is below that necessary in the subject inventive frits, the levels of Na$_2$O and B$_2$O$_3$ are higher, and fluoride is a required component.

U.S. Pat. No. 4,731,347 (Stetson) records lead-free frits devised for coating stainless steel and various nickel-based alloys, the frits consisting essentially, in weight percent, of

| SiO$_2$ | 44–54 | K$_2$O | 10–13 |
|---|---|---|---|
| B$_2$O$_3$ | 10–14 | CaO | 4–6 |
| Li$_2$O | 3–4 | SrO | 1–2 |
| Na$_2$O | 13–16 | BaO | 2–3. |

The concentration of SiO$_2$ is generally less than required in the present inventive frits, the amount of alkali metal oxide exceeds the maximum permitted in the inventive frits, and Al$_2$O$_3$ constitutes no part of the frit composition.

U.S. Pat. No. 4,814,298 (Nelson et al.) discloses lead-free glazes having compositions within the following ranges expressed in terms of mole percent.

| SiO$_2$ | 55–75 | Na$_2$O | 3–9 |
|---|---|---|---|
| B$_2$O$_3$ | 8–13 | ZrO$_2$ | 2–5 |
| Al$_2$O$_3$ | 0.5–3 | BaO | 0.5–16 | with up to 12% total of 0–5% K$_2$O+0–10% LiO$_2$O+0–2% MgO+0–5% CaO+0–3% SrO+0–2% ZnO.

None of the working examples provided in the patent had a composition coming within the ranges required in the present inventive glazes. In general, the SiO$_2$ and B$_2$O$_3$ contents are higher than the maxima permitted in the subject inventive glazes, the Al$_2$O$_3$ levels are too low, and ZrO$_2$ is a necessary ingredient.

U.S. Pat. No. 4,970,178 (Klimas et al.) describes lead-free glazes consisting essentially, in mole percent, of

| SiO$_2$ | 45–60 | Li$_2$O | 0–5 | Al$_2$O$_3$ | 0–4 |
|---|---|---|---|---|---|
| B$_2$O$_3$ | 6–13 | CaO | 0–8 | ZrO$_2$ | 0–6 |
| ZnO | 8–25 | SrO | 0–8 | TiO$_2$ | 0–7 |
| Na$_2$O | 5–14 | BaO | 0–9 | WO$_3$ | 0–1. |
| K$_2$O | 0–8 | Bi$_2$O$_3$ | 0–10 | | |

None of the working examples provided in the patent comes within the composition intervals demanded in the present inventive glazes. Furthermore, the SiO$_2$ and Al$_2$O$_3$ concentrations are generally lower than the minimum needed in the instant inventive glazes and the B$_2$O$_3$ and ZnO levels are generally higher than can be tolerated in the subject inventive glazes.

DESCRIPTION OF PREFERRED EMBODIMENTS

Table I reports a group of glass compositions, expressed in terms of parts by weight on the oxide basis as calculated from the batch, illustrating the scope of the present invention. Because the sum of the several components totals or closely approximates 100, for all practical purposes the individual values may be considered to reflect weight percent. In general, the actual batch ingredients may be any materials, either an oxide or other compound, which, when melted in combination with the other ingredients, will be converted into the desired oxide in the proper proportions. For example, Na$_2$CO$_3$ and CaCO$_3$ can provide the source of Na$_2$O and CaO, respectively.

The batch materials were compounded, thoroughly mixed together to assist in securing a homogeneous melt, and that mixture charged into platinum or silica crucibles. The crucibles were moved into a furnace operating at about 1400° C. and the batches were melted therein for about 3 hours. One portion of each melt was poured into a steel mold to form a glass slab having dimensions of about 3"×3"×0.5" (~7.6×7.6×1.25 cm) and that slab was transferred immediately to an annealer operating at about 550° C. The remainder of each melt was poured as a fine stream into a bath of tap water (that practice being termed "drigaging" in the glass art) to produce finely-divided glass particles which were further comminuted through milling to particles averaging 15 microns in size.

It will be appreciated that the above description of mixing, melting, and forming procedures represents laboratory activity only and that the glass compositions operable in the present invention are capable of being processed employing mixing, melting, and forming practices conventionally employed in commercial glass-making. That is, it is only necessary that the batch ingredients be thoroughly blended together, melted at a sufficiently high temperature for a sufficient length of time to obtain a homogeneous melt, and thereafter formed into a glass article.

TABLE I

| | 1 | 2 | 3 | 4 | 5 | 6 |
|---|---|---|---|---|---|---|
| Li$_2$O | 1.7 | — | 1.7 | — | — | — |
| Na$_2$O | 5.0 | 6.5 | 5.0 | 6.5 | 4.8 | 4.8 |
| K$_2$O | 7.7 | 7.4 | 7.7 | 7.5 | 7.4 | 7.4 |

TABLE I-continued

|     | | | | | | |
| --- | --- | --- | --- | --- | --- | --- |
| ZnO | 8.7 | 8.5 | 6.4 | 6.2 | 8.4 | — |
| SrO | — | 3.0 | — | 3.0 | 5.5 | 10.7 |
| $B_2O_3$ | 11.3 | 11.0 | 11.4 | 11.1 | 10.9 | 10.9 |
| $Al_2O_3$ | 6.0 | 5.8 | 6.0 | 5.8 | 5.7 | 5.7 |
| $SiO_2$ | 59.6 | 57.8 | 60.2 | 58.3 | 57.2 | 57.3 |
| CaO | — | — | 1.6 | 1.6 | — | 3.0 |

|     | 7 | 8 | 9 | 10 | 11 | 12 |
| --- | --- | --- | --- | --- | --- | --- |
| $Li_2O$ | — | — | — | — | — | 0.6 |
| $Na_2O$ | 6.4 | 4.7 | 4.6 | 4.7 | 4.5 | 4.6 |
| $K_2O$ | 7.3 | 7.1 | — | 3.6 | — | 1.7 |
| ZnO | 4.3 | 8.7 | 11.5 | 11.8 | 11.3 | 8.6 |
| SrO | 8.1 | — | — | — | — | — |
| BaO | — | 7.6 | 13.0 | 7.5 | 12.7 | 13.1 |
| $B_2O_3$ | 10.9 | 10.6 | 10.4 | 10.6 | 12.1 | 10.5 |
| $Al_2O_3$ | 5.7 | 5.7 | 5.6 | 5.7 | 5.5 | 5.6 |
| $SiO_2$ | 57.2 | 55.5 | 54.7 | 56.0 | 53.6 | 55.0 |

Bars were cut from the glass slabs for use in determining the linear coefficient of thermal expansion (Exp) over the temperature range of 25°-300° C., expressed in terms of $\times 10^{-7}/°C.$, the softening point (S.P.), recorded in °C., a qualitative assessment of resistance to attack by alkaline detergents (Deter) and a qualitative assessment of the resistance to attack by acetic acid (Acid).

The assessment of resistance to acetic acid involved immersing the glazed samples into a bath of 4% aqueous acetic acid solution at room temperature for 24 hours, withdrawing the samples from the bath, and visually examining the samples to observe the presence of lack of gloss, the occurrence of porosity, and/or any discoloration (irridescence) resulting from attack by the acid. In Table II, "irr" indicates the occurrence of irridescence and "nc" indicates no change.

The assessment of resistance to detergent attack involved the following procedure:

(a) a 0.3% by weight aqueous solution of SUPER SOILAX ® detergent, marketed by Economics Laboratories, St. Paul, Minn., is prepared;

(b) that solution is heated to 95° C.;

(c) glazed samples are immersed into the hot solution; and (d) after an immersion of 72 hours the samples are withdrawn and inspected visually to observe any change in the gloss of the glaze.

The appearance of the gloss was deemed to be acceptable after this test with all the glazes of Table I.

The frits of Table I were mixed with a commercial aqueous binder medium and the resulting slip sprayed onto green SUPREMA ® cups and small plates, i.e., onto ware formed from the precursor glass. The coated ware was then placed in an electrically heated furnace and heated at a rate of about 300° C./hour to 980° C., held at that temperature for one hour, and then cooled to room temperature at furnace rate. As employed here, "cooled at furnace rate" indicates that the electric current to the furnace was cut off and the furnace allowed to cool to room temperature with the ware retained therewithin. The above practice enables the ware to be crystallized and glazed concurrently in one operation.

With large dinnerware plates having a diameter of about 10.5" (~26.7 cm) thermal deformation is hazarded at temperatures used in crystallizing the green glass. Accordingly, the large plates will be supported on formers or setters during the crystallization heat treatment. The frit-containing slip is thereafter applied to the ware and fired, preferably for 4 hours at 940° C.

Table II reports measurements of linear coefficient of thermal expansion over the temperature range 25°-300° C. expressed in terms of $10^{-7}/°C.$ (Exp), softening points in °C. (S.P.), and the visual appraisal of resistance to attack by acetic acid (Acid). A measure of flow exhibited by the glaze during firing (fire) was also visually appraised. Because the large dinnerware plates must be glazed at a lower temperature than cups and other small items can be, the flow of the glaze thereon is somewhat less. Accordingly, a firing rating of 0 is considered to be excellent on flatware (and cups); a rating of 1 is considered to be quite acceptable on flatware and excellent on cups; a rating of 2 is considered to be acceptable on cups, but marginal only on flatware; and a rating of 3 indicates insufficient flow.

TABLE II

|     | 1 | 2 | 3 | 4 | 5 | 6 |
| --- | --- | --- | --- | --- | --- | --- |
| Exp. | 75.5 | 77.3 | — | — | 72.6 | 78.6 |
| S.P. | 652 | 702 | — | — | 722 | 736 |
| Acid | nc | nc | nc | nc | nc | nc |
| Fire | 0 | 1 | 1 | 1 | 1 | 2 |

|     | 7 | 8 | 9 | 10 | 11 | 12 |
| --- | --- | --- | --- | --- | --- | --- |
| Exp. | 79.4 | 73.7 | 60 | — | — | — |
| S.P. | 715 | 730 | 780 | — | — | — |
| Acid | nc | nc | nc | irr | irr | irr |
| Fire | 1 | 2 | 3 | 3 | 3 | 3 |

The criticality of composition control is evidenced in Examples 9-12 which have compositions slightly outside of the prescribed ranges and fail to meet the demanded product requirements.

Based upon an overall combination of properties, Examples 1 and 2 are deemed to constitute the most preferred glasses. Example 2 comprised an illustrative example in U.S. application Ser. No. 870,676, filed concurrently herewith by D. H. Crooker and L. M. Echeverria under the title COLORED GLAZES HAVING CONTROLLED TEXTURES AND METHOD OF PREPARATION and assigned to the same assignee as the present application.

I claim:

1. A glass frit composition essentially free from lead and cadmium exhibiting a linear coefficient of thermal expansion (25°-300° C.) of about $70-85 \times 10^{-7}/°C.$, good flow at temperatures between 900°-1000° C., a softening point of about 650°-740° C., and excellent resistance to attack by acetic acid and detergent consisting essentially, expressed in terms of weight percent on the oxide basis, of

| | | | |
| --- | --- | --- | --- |
| $SiO_2$ | 51-59 | CaO | 0-7 |
| $Li_2O$ | 0-2 | SrO | 0-12 |
| $Na_2O$ | 3.5-7 | BaO | 0-9 |
| $K_2O$ | 6-8.5 | ZnO | 0-10 |
| $Li_2O + Na_2O + K_2O$ | 10-15 | CaO + SrO + BaO + ZnO | 8-18 |
| $B_2O_3$ | 9-12 | $Al_2O_3$ | 4.5-7 | with the proviso that the mole ratio $(Li_2O + Na_2O + K_2O):(CaO + SrO + BaO + ZnO)$ is greater than 1.0 and ranges up to about 1.4.

2. A glass frit according to claim 1 wherein said frit consists essentially of

| | | | |
| --- | --- | --- | --- |
| $Li_2O$ | 1-2 | ZnO | 7-9.5 |
| $SiO_2$ | 55.5-58.5 | $B_2O_3$ | 10-11.5 |
| $Na_2O$ | 4-7 | SrO | 2.5-6.5 |

-continued

| | | | |
|---|---|---|---|
| K$_2$O | 6.5-8 | Al$_2$O$_3$ | 5-6.5 | with the proviso that the mole ratio (Li$_2$O+Na$_2$O+K$_2$O):(CaO+SrO+ZnO) ranges up to about 1.2.

3. A composite article consisting of a glass-ceramic body containing potassium fluorrichterite and cristobalite in amounts in excess of 10% by volume as essentially the sole crystal phases and an adherent glaze essentially free from lead and cadmium exhibiting a linear coefficient of thermal expansion (25°-300° C.) of about 70-85×10$^{-7}$/°C., a softening point of about 650°-740° C., and excellent resistance to attack by acetic acid and detergent consisting essentially, expressed in terms of weight percent on the oxide basis, of

| | | | |
|---|---|---|---|
| SiO$_2$ | 51-59 | CaO | 0-7 |
| Li$_2$O | 0-2 | SrO | 0-12 |
| Na$_2$O | 3.5-7 | BaO | 0-9 |
| K$_2$O | 6-8.5 | ZnO | 0-10 |
| Li$_2$O + Na$_2$O + K$_2$O | 10-15 | CaO + SrO + BaO + ZnO | 8-18 |
| B$_2$O$_3$ | 9-12 | Al$_2$O$_3$ | 4.5-7 | with the proviso that the mole ratio (Li$_2$O+Na$_2$O+K$_2$O):(CaO+SrO+ZnO) is greater than 1.0 and ranges up to about 1.4.

4. A composite article according to claim 3 wherein said glaze consists essentially of

| | | | |
|---|---|---|---|
| Li$_2$O | 1-2 | ZnO | 7-9.5 |
| SiO$_2$ | 55.5-58.5 | B$_2$O$_3$ | 10-11.5 |
| Na$_2$O | 4-7 | SrO | 2.5-6.5 |
| K$_2$O | 6.5-8 | Al$_2$O$_3$ | 5-6.5 | with the proviso that the mole ratio (Li$_2$O+Na$_2$O+K$_2$O):(CaO+SrO+ZnO) ranges up to about 1.2.

* * * * *